United States Patent
Bala (10) Patent No.: US 7,343,426 B2
(45) Date of Patent: Mar. 11, 2008

(54) TRANSPARENT COUPLING BETWEEN COMPATIBLE CONTAINERS COMMUNICATING OVER NETWORKS

(75) Inventor: Vasanth Bala, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 10/699,371

(22) Filed: Oct. 31, 2003

(65) Prior Publication Data

US 2005/0097178 A1    May 5, 2005

(51) Int. Cl.
*G06F 13/00* (2006.01)
(52) U.S. Cl. .................. 709/246; 709/219; 709/230; 709/249
(58) Field of Classification Search ............... 709/217, 709/219, 223, 224, 230, 246, 249
See application file for complete search history.

(56) References Cited

U.S. PATENT DOCUMENTS 7,159,224 B2 * 1/2007 Sharma et al. ............. 719/310

| | | | |
|---|---|---|---|
| 2003/0005181 A1 * | 1/2003 | Bau et al. | 709/330 |
| 2003/0033369 A1 * | 2/2003 | Bernhard | 709/203 |
| 2003/0110242 A1 * | 6/2003 | Brown et al. | 709/222 |
| 2003/0188039 A1 * | 10/2003 | Liu et al. | 709/315 |
| 2005/0080768 A1 * | 4/2005 | Zhang et al. | 707/3 |

* cited by examiner

*Primary Examiner*—Viet Vu
(74) *Attorney, Agent, or Firm*—Ryan, Mason & Lewis, LLP; Douglas W. Cameron, Esq.

(57) ABSTRACT

A first container executing on a first computer determines, by using one or more messages defined by an open-standard protocol and communicated over one or more networks coupled to the second computer, whether the second container, executing on a second computer, can communicate using messages having a portion not defined by the open-standard protocol and having a portion defined by the open-standard protocol. The first container communicates, with the second container, at least one additional message having the portion not defined by the open-standard protocol and having the portion defined by the open-standard protocol. The portion not defined by the open-standard protocol occupies a predetermined part of the message that would be defined by the open-standard protocol if the open-standard protocol were used for the predetermined part.

25 Claims, 5 Drawing Sheets

TRANSPARENT COUPLING BETWEEN COMPATIBLE CONTAINERS COMMUNICATING OVER NETWORKS

FIELD OF THE INVENTION

The present invention relates to communication between computers and, more particularly, relates to containers executing on computers and communicating over networks.

BACKGROUND OF THE INVENTION

"Web Services" is a mechanism being promoted by the computer industry for enabling dynamic business-to-business integration. For example, Web Services technology enables an enterprise to electronically integrate their supply chain management (SCM) system with the SCM systems of their part suppliers, allowing real-time optimization of the supply chain in response to dynamic demand and supply fluctuations.

A Web Service interaction generally involves execution of logic at two endpoints, both of which is performed by a computer: the server that hosts the service logic, and the client that hosts the application invoking the Web Service. Because the endpoints of a Web Service are typically separated by a network, the Web Service mechanism is designed to work independently of the "container" that hosts the execution at each endpoint. Most container implementations support widely accepted Web Services open-standard protocols such as Simple Object Access Protocol (SOAP) and eXtensible Markup Language (XML), which are helpful in making this independence possible. The Web Service mechanism in this example includes the service logic and application, which are each created to use its respective container. Each container supports the Web Services open-standard protocols so that the service logic and application do not need to be designed to support the open-standard protocols and, instead, are designed to perform whatever business service is being transacted.

Certain open-standard protocols, like SOAP, define aspects of communication over networks, such as how messages are constructed and interpreted. A benefit to this is that each container can be made by a different manufacturer, as each container still "speaks" the same "language" defined by the open-standard protocols being used to communicate.

Nonetheless, communicating through open-standard protocols also limits containers in what can be communicated. For instance, the containers can be considered to be loosely "coupled" because the open-standard protocols limit the containers to messages having generally restrictive formats and allowing only particular contained information. Information specific to a container generally is converted to a less convenient format or even ignored. Basically, data that is communicated between two containers on two different computers has to be made to fit the messages defined by the open-standard protocol. Consequently, it would be beneficial to provide communication techniques that are not so limiting and provide better coupling between containers that communicate over networks.

SUMMARY OF THE INVENTION

Exemplary aspects of the present invention provide transparent coupling between compatible containers communicating over networks.

In an exemplary aspect of the invention, a first container determines, by using one or more messages defined by an open-standard protocol and communicated over a network coupled to a second container, whether the second container can communicate using messages having a portion not defined by the open-standard protocol and having a portion defined by the open-standard protocol. The first container communicates, with the second container, one or more additional messages having the portion not defined by the open-standard protocol and having the portion defined by the open-standard protocol. The portion not defined by the open-standard protocol occupies a predetermined part of an additional message that would be defined by the open-standard protocol if the open-standard protocol were used for the predetermined part.

A more complete understanding of the present invention, as well as further features and advantages of the present invention, will be obtained by reference to the following detailed description and drawings.

DETAILED DESCRIPTION OF PREFERRED EMBODIMENTS

As described above, many containers communicate through networks using messages defined by open-standard protocols. A problem with using open-standards-based communication for Web Service interaction is that it is a common-denominator approach, which forces a fairly loose coupling of the containers running at the endpoints. This can create technical problems, such as performance loss due to variations in network latency or difficulty in reliably maintaining transaction state during successive back-and-forth communication during the lifetime of the Web Service interaction. It also makes it difficult for any one vendor to differentiate their particular Web Services container from the competition effectively, since the overall behavior of the Web Service is determined by the performance and feature characteristics of both the server and client side containers, rather than any one of them alone.

Moreover, a tighter coupling between compatible containers can improve cross-sell opportunities. For example, if one business is already a customer using a particular container, then a partner or supplier of that business may also want to use the particular container because of the greater reliability and performance that a tighter coupling between the containers would provide. However, there is a barrier to implementing tighter coupling, which is that adherence to open-standard protocols is important because it lowers the vendor lock-in risk for businesses. In other words, a business can select from many vendors because the containers from the vendors are all compliant with the same open-standard protocol. The business would like to choose between vendors, and selecting a vendor who uses a protocol that is not compatible with the open-standard protocol limits choice.

Hence, there is a problem of how to create a tighter coupling between compatible containers while still adhering to open-standard protocols.

Exemplary aspects of the present invention enable a vendor to overcome this problem in an elegant and practical way. Certain exemplary techniques of the present invention can be described using an analogy: when two people meet for the first time, they often greet each other in an internationally understood language such as English, and if they discover that they both speak another native language, they will subsequently continue to converse in that native language. Open-standard protocols, in this analogy, are the equivalent of English: the open-standard protocols must be used when the container at one Web Service endpoint knows nothing about the container at the other endpoint. Once the two containers establish that they are different instances of the same or similar container implementations, the containers can switch to using messages having a portion not defined by the open-standard protocol but also having a portion defined by the standard. Because this switch is between the two containers and applications using the two containers need not know about the switch, the switch is considered to be transparent.

An example of messages that can have portions defined by and not defined by an open-standard protocol involves the SOAP. For SOAP messages, the XML data payload defined by the SOAP can be used to house data such as executable statements, binary information, records, and database tables. SOAP version 1.1 is described in SOAP version 1.1, World Wide Web Consortium (W3C) Note 08 (May 2000). The housed data is not defined by the SOAP version 1.1 and occupies a portion of the message that is defined by SOAP version 1.1. Switching to using messages having portions defined by and not defined by the open-standard protocol enables the containers to achieve efficiencies that might otherwise be impossible.

Thus, in an exemplary embodiment of the present invention, only an initial handshake is performed using an open-standard protocol, and subsequent communication can be done using, for instance, information defined by a native protocol and contained within a message having portions defined by the open-standard protocol. Using information defined by a native protocol enables tighter coupling between the containers at the endpoints of a Web Service transaction, thereby improving the performance and reliability of the overall Web Service itself. It also offers the container vendor a strategically valuable channel for adding proprietary value in a world of open standards.

Exemplary aspects of the present invention describe a mechanism that is transparent to the Web Service logic on the server and the application logic on the client. Thus, with exemplary aspects of this invention, the service provider and the service user need not do anything special in order to enable a tighter coupling between their respective underlying containers.

Figure 1A:
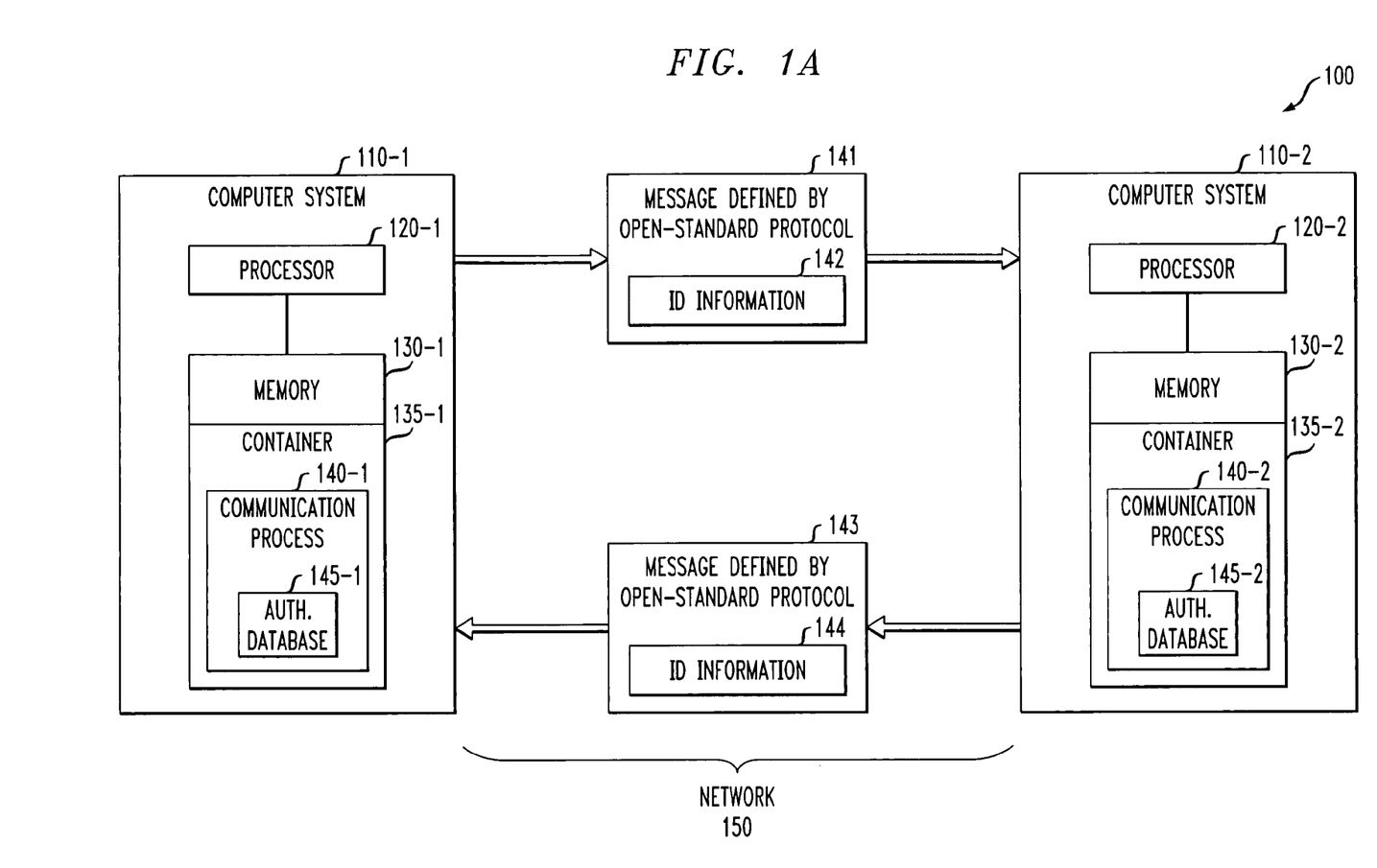
FIGS. 1A and 1B are examples of a system operating in accordance with an embodiment of the present invention.

Turning now to FIG. 1A, a system 100 is shown that allows transparent coupling between computers communicating over a network 150. System 100 comprises a computer system 110-1 communicating with a computer system 110-2 through network 150. Each computer system 110 comprises a processor 120 coupled to a memory 130. Processor 110 and memory 130 may be singular or distributed. Memory 130 comprises a container 135 having a communication process 140. Communication process 140 comprises an authentication database 145. Container 135 is an implementation of a runtime environment for a programming model. For example, "WebSphere" is a container 135 that implements the Java 2 platform, Enterprise Edition (J2EE) programming model. The container 135 is generally implemented as a software application that exports an Application Programming Interface (API), which can be used by an "application" that executes on top of that container, such as a Web Services platform or an operating system.

In the example of FIG. 1A, the communication process 135 takes information (not shown) from the container 135 and packages the information using messages 141, 143 that are completely defined by an open-standard protocol, such as SOAP. An open-standard protocol is a schema for communication, where the format and behavior of the schema have been defined by a standards body. The standards body may comprise companies that may be commercial competitors. For example, SOAP is defined by the W3C organization. It should be noted that although the messages 141, 143 are defined by the open-standard protocol, other protocols may be used by the open-standard protocol that defines the messages 141, 143. For instance, SOAP is an XML-based protocol. SOAP is used to define the messages, however, while XML is the protocol used to encode a SOAP message. Nonetheless, it is SOAP, and not XML, that defines how messages are structured, what the parts of the structure are, and what can be placed into the parts of the structure.

Figure 4:
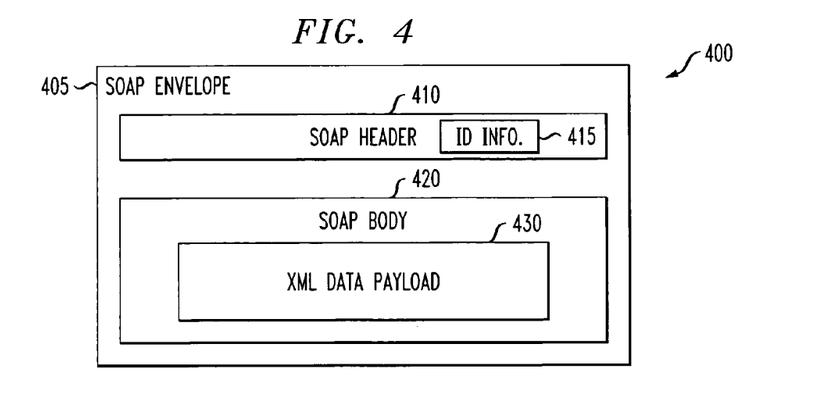
FIG. 4 is an example of a message defined by an open-standard protocol called SOAP.

In FIG. 1A, handshaking is occurring. During handshaking, the communication process 140-1 (for instance) sends a message 141 completely defined by the open-standard protocol being used for the communication. The communication process 140-1, using the open-standard protocol, sends message 141 that contains identification (ID) information 142. The ID information 142 is allowed by the open-standard protocol. An example of a location where ID information 142 may be added to a message in accordance with the open-standard protocol is shown in FIG. 4. The communication process 140-2 receives the message 141 and determines if the ID information 142 allows the communication process 140-2 to communicate with the communication process 140-1 through the use of messages having portions not defined by the open-standard protocol. Illustratively, the communication process 140-2 can compare the ID information 142 against information in the authentication database 145-2. Any suitable technique may be used for this authentication.

If there is no authentication, the message 143 will not contain any return ID information 144. Additionally, if the communication process 140-2 is not designed in accordance an exemplary embodiment of the present invention, the ID information 142 in message 141 will be ignored. However, if there is an authentication, the communication process 140-2 will send message 143 having return ID information 144.

When the communication process 140-1 receives the message 143, it examines it for return ID information 144. If the ID information 144 is there, then the communication process sends another packet 141 where the ID information 142 is an acknowledgment. At this point, both communication processes 140 can use messages having portions not defined by the open-standard protocol.

Figure 1B:
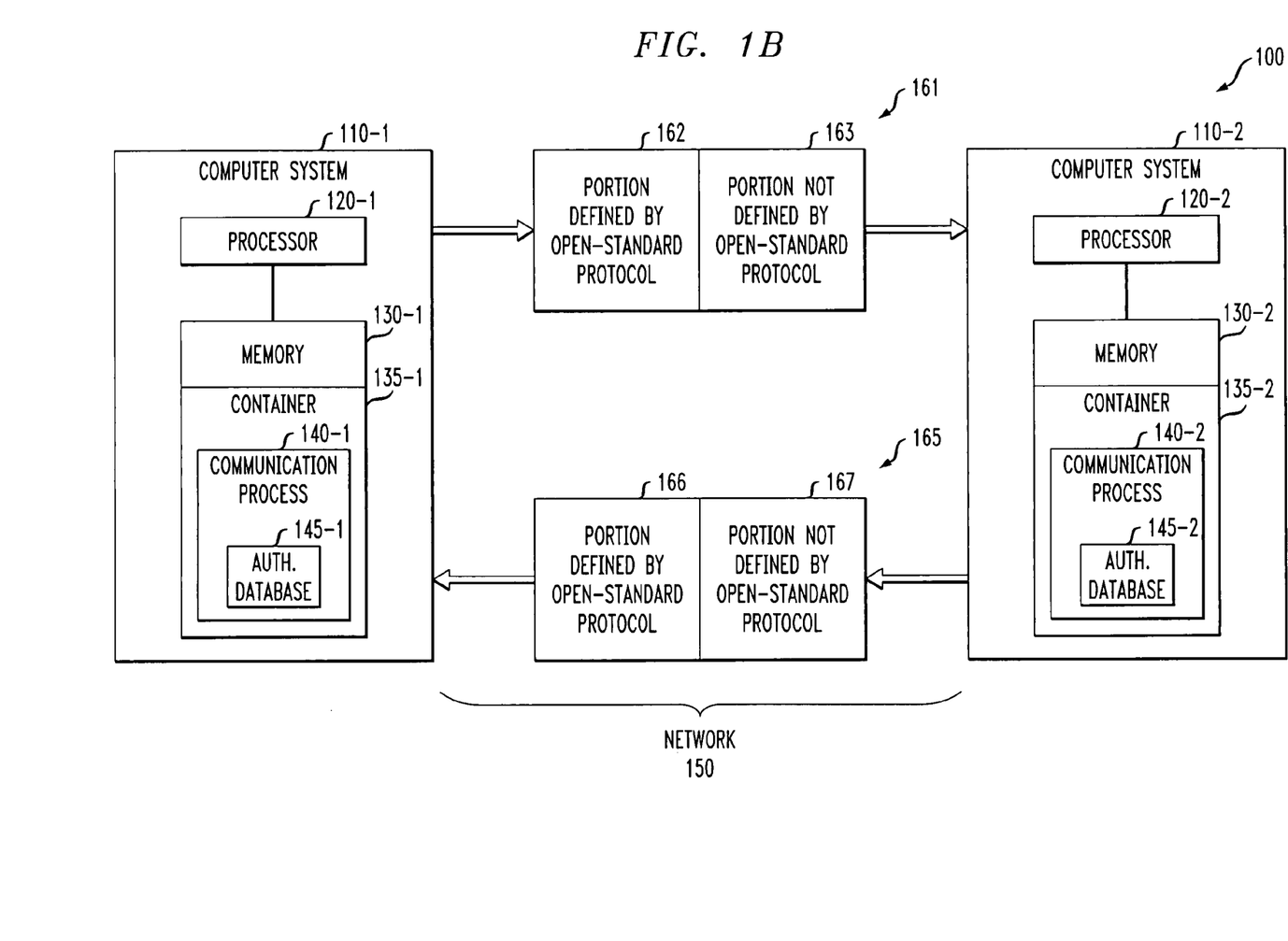

FIG. 1B shows an example where both communication processes 140 can use messages having portions not defined by the open-standard protocol. In this example, the packet 161 sent by communication process 140-1 has a portion 162 defined by the open-standard protocol and a portion 163 not defined by the open-standard protocol. The portion 163 occupies a predetermined part of the message 161 that would be defined by the open-standard protocol if the part were not occupied with portion 163. Similarly, the packet 165 sent by communication process 140-2 has a portion 166 defined by the open-standard protocol and a portion 167 not defined by the open-standard protocol. The portion 167 occupies a portion of the message 165 that is defined by the open-standard protocol.

The portions 163 and 167 not defined by the open-standard protocol can be, for instance, information defined by a native protocol used by the containers 135, executable statements, parts of a database, tables, binary information or some combination of these. The portions 163 and 167 will not be understood by or will be misinterpreted by a communication process 140 that is programmed to deal with messages defined solely by the open-standard protocol.

Portions 163, 167 of messages 161, 165 allow the containers 135 to be more tightly coupled than when messages are defined solely by an open-standard protocol, as data can be sent via the portions 163, 167 that is proprietary to the containers 135. This coupling may be transparent, in that other containers 135 that cannot decipher portions 163, 167 will not know of the portions 163 and 167. Additionally, a container 135-1 (for example) that can interpret portions 163, 167 can also communicate with a container 135-2 (for example) that cannot interpret portions 163, 167. In the latter instance, the container 135-1 can communicate with container 135-2 without using portions 163, 167 and, instead, by using messages that are completely defined by the open-standard protocol. Furthermore, an application (not shown) that is passing information through communication process 140-1 generally will not know that portions 163, 167 are being used for communication over network 150.

Exemplary embodiments of the present invention described herein may be implemented as an article of manufacture comprising a machine-readable medium, as part of memory 130-1 or 130-2 for example, containing one or more programs that when executed implement embodiments of the present invention. For instance, the machine-readable medium may contain a program configured to provide transparent coupling between containers communicating through messages defined by an open-standard protocol. The machine-readable medium may be, for instance, a recordable medium such as a hard drive, an optical or magnetic disk, an electronic memory, or other storage device.

Figure 2:
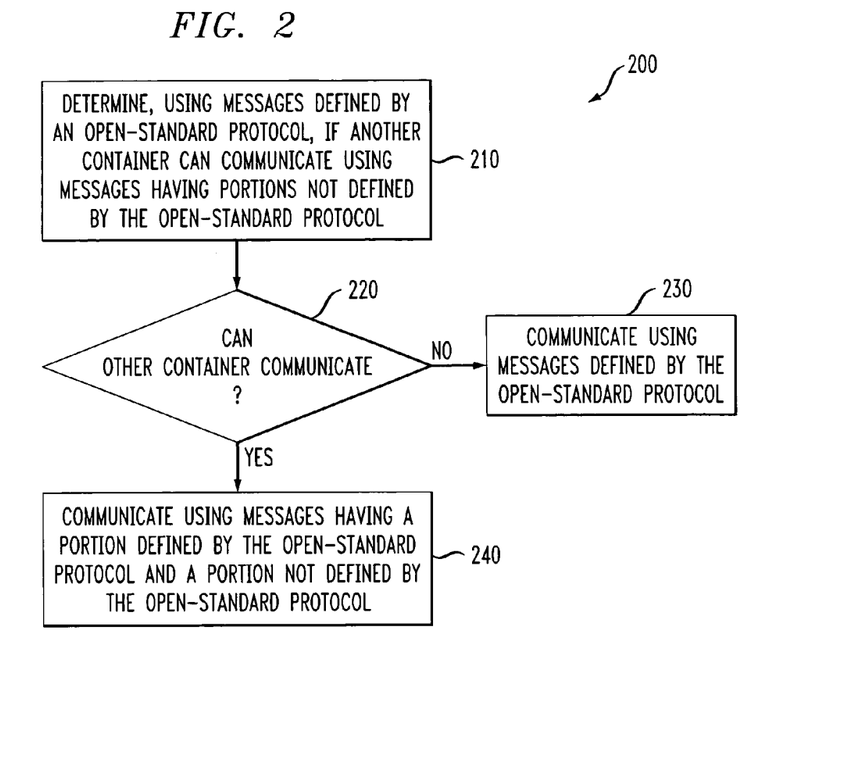
FIG. 2 is an exemplary method for transparent coupling between containers communicating through a network.

Turning now to FIG. 2, an exemplary method 100 is shown for transparent coupling between containers communicating through a network. In this example, containers on computers are communicating. Method 200 is generally performed by a communication process 140, which is generally part of a container 135. In step 210, it is determined if another container 135 can communicate by using messages having portions not defined by the open-standard protocol. Step 210 is usually performed, as described above in reference to FIG. 1A, by using messages solely defined by the open-standard protocol. As explained above, one way to perform step 210 is by performing handshaking in order to determine that both containers (e.g., the "local" container and a "remote" container, both of which can perform method 200) can communicate by using messages having portions not defined by the open-standard protocol. For instance, information could be embedded in messages solely defined by the open-standard protocol, and the information could be used to determine that the container 135 can communicate by using messages having portions not defined by the open-standard protocol.

If the other container 135 can communicate by using portions of messages not defined by the open-standard protocol (step 220=YES), then communication is begun using portions of messages not defined by the open-standard protocol (step 240). If the other container cannot communicate by using portions of messages not defined by the open-standard protocol (step 220=NO), then communication is begun using messages completely defined by the open-standard protocol (step 230).

FIGS. 3 through 7 give examples of embodiments of the present invention. These examples are more specific embodiments of FIGS. 1A, 1B and 2.

Figure 3:
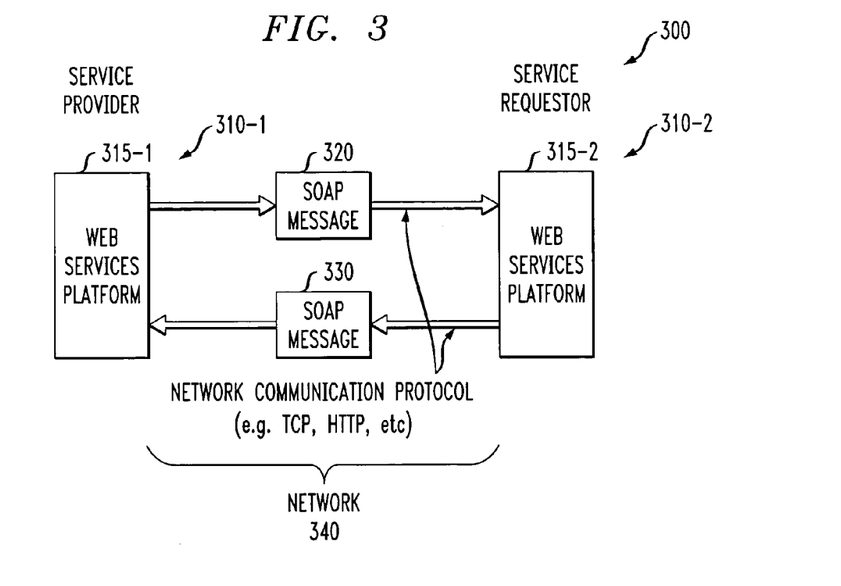
FIG. 3 is another example of a system operating in accordance with an embodiment of the present invention.

Exemplary embodiments of the invention are described below using the following scenario. Referring now to FIG. 3, Computers 310-1 and 310-2 are two separate computers on a network 340, each running different instances of a Web Services platform 315-1, 315-2 from a provider. Computer 310-1 will be called the "service provider 310-1" herein, and computer 310-2 will be called the "service requester 310-2" herein. In this example, the Web Services platforms 315-1, 351-2 are the containers. The Web Services platforms 315-1, 351-2 could be, for instance, a J2EE runtime environment, an exemplary implementation of which is the IBM WebSphere Application Server. Computer 310-1 runs a J2EE application (not shown in FIG. 3 but shown in FIG. 6) that provides a Web Service. Service requester 310-2 runs another J2EE application (not shown in FIG. 3 but shown in FIG. 6) that uses the Web Service provided by service provider 310-1. The Web Services platforms 315-1, 315-2 provide an API (not shown) that provides Web Services and that enables an application executing in the Web Services platforms 315-1, 315-2 to use a familiar procedure-call interface to communicate, using an open-standard SOAP protocol, with another application over network 340.

In this example, Web Services communication between the two Web Services platforms 315 is performed through SOAP messages 320, 330, which could be completely defined by SOAP or have portions not defined by SOAP. Additionally the SOAP messages 320, 330 are communicated using lower-level protocols such as Transmission Communication Protocol (TCP) and HTTP. FIG. 4 shows an example of a SOAP message 400 defined by SOAP 1.1, which has been incorporated by reference above. Message 400, which is completely defined by SOAP, comprises a SOAP envelope 405, a SOAP header 415, and a SOAP body 420. SOAP header 410 comprises ID information 415. SOAP 1.1 allows the SOAP header 410 to be extensible, meaning that additional fields can be added to the header aside from the required fields. SOAP body 420 comprises XML data payload 430. SOAP 1.1 allows an XML data payload 430 in the SOAP body 420. As described above in reference to FIGS. 1A and 2, ID information 415 is used to determine if two containers support messages having portions not defined by SOAP. If one of the two containers does not support messages having portions not defined by SOAP, then SOAP messages 400 are used, generally without ID information 415.

Figure 5:
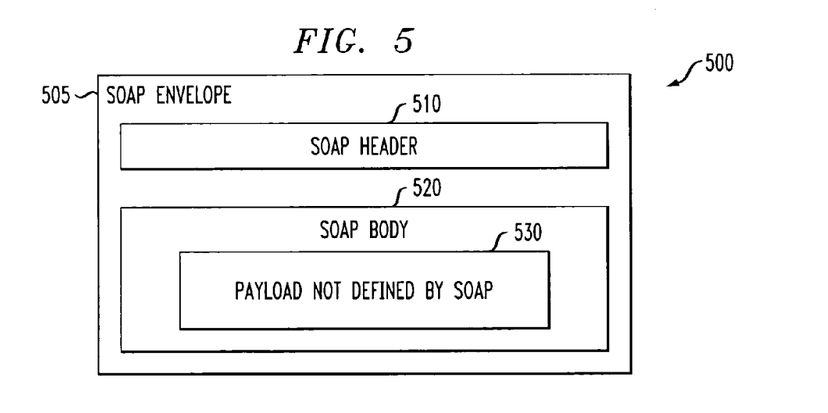
FIG. 5 is an example of a message having a portion not defined by the SOAP and having a portion defined by the SOAP.

On the other hand, if both containers support messages having portions not defined by SOAP, then the format of message 500, shown in FIG. 5, may be used. In the example of FIG. 5, SOAP message 500 comprises SOAP envelope 505, SOAP header 510 and SOAP body 520. SOAP body 520 comprises payload 530 that is not defined by SOAP. Payload 530 could comprise, for instance, database elements, such as tables and records, binary information, executable statements, and proprietary information. A specific example where executable statements are used in payload 530 is shown in reference to FIGS. 6 and 7.

Figure 6:
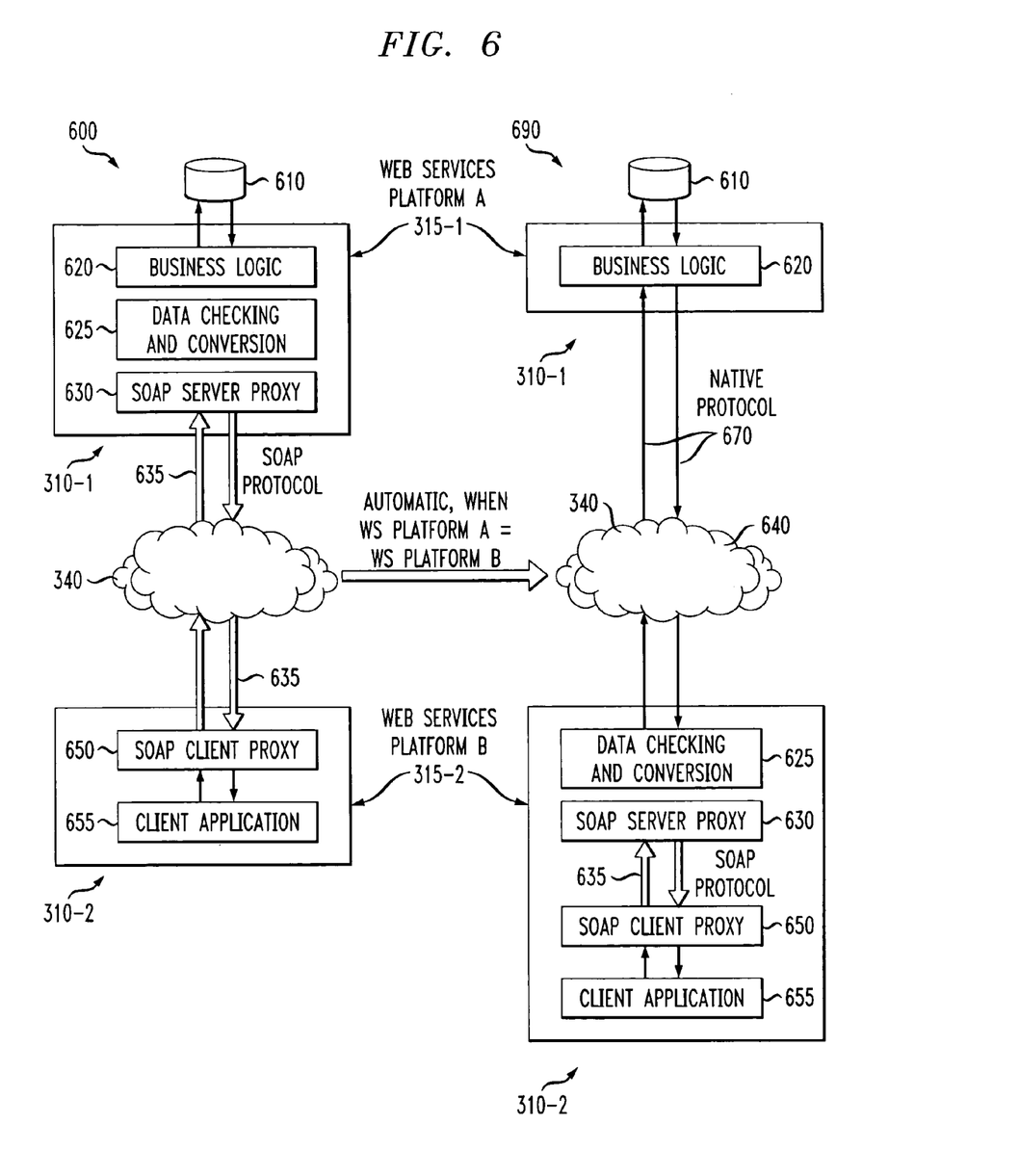
FIG. 6 illustrates examples of two systems communicating using an embodiment of the present invention.

Turning now to FIG. 6, reference 600 shows service provider 310-1 and service requester 310-2 prior to offloading of executable modules in accordance with an exemplary embodiment of the present invention, and reference 690 shows service provider 310-1 and service requester 310-2 after the exemplary embodiment of the present invention has been used. In this example, Web Services platform 315-1 comprises an application called business logic 620, a data checking and conversion module 625, and a SOAP server proxy 630. Web Services platform 315-1 is connected to a database 610. SOAP protocol 635 is used for messages over network 340. Web Services platform 315-2 comprises a SOAP client proxy 650 and a client application 655.

Since Web Services communication can done using SOAP messages with XML data payloads, some logic on the server side (e.g., service provider 310-1) is typically needed to handle the conversion of data in SOAP format to a native data format that the business logic 620 and the backend database 610 are programmed to understand. This logic is represented by the SOAP server proxy 630 in FIG. 6. The SOAP server proxy 630 extracts the XML payload from a SOAP message received from the Web Service requester (e.g., client application 655), and later packages returned XML data as a payload in a SOAP message to be sent as the response.

On the side of the Web Service requester 310-2, a similar SOAP client proxy 655 is used to allow the client application 655 to send requests and receive responses from the Web Service provider 310-1. Because the SOAP client proxy 655 can be different for different Web Service providers, it is usually generated automatically. This may be done by the client-side Web Services platform 315-2 (e.g., a container) by consulting a Web Service Definition Language (WSDL) file (not shown) published by the Web Service provider. The WSDL file is an XML file that describes the Web Service interface, and whose location is defined by a Uniform Resource Locator (URL) so that the URL can be accessed using standard HyperText Transmission Protocol (HTTP) protocols. The description of the Web Service interface contains information such as the number of parameters, their type, the format of the return value, its type, and so on. Based on this information, the client-side container of the Web Services platform 315-2 automatically generates a client-side SOAP proxy 650. The proxy 650 makes the remote Web Service interfaces provided by the service provider 310-1 appear as local procedure call interfaces. It should be noted that the SOAP proxies 630, 650 are an integral part of the containers 315-1, 315-2, respectively.

In an exemplary embodiment of this invention, the client-side container (e.g., Web Services platform 315-1) on the service requester 310-1 sends additional information (not shown) in a SOAP header (not shown) of a SOAP message (not shown) that initiates the Web Service transaction with the server side container (e.g., the Web Services platform 315-2). In the following description, the Web Services platform 315-1 will be called the "client-side container 315-1," while the Web Services platform 315-2 will be called the "server-side container 315-2." In FIG. 4, the additional information is the ID information 415. This additional information identifies the client-side container 315-1. The server-side container 315-2 is designed to look for this additional information in the SOAP header when it receives a SOAP message. If the server-side container 315-2 finds the additional information, and authenticates its validity, the server-side container 315-2 sends back a SOAP message with information in the header that identifies the server-side container 315-2 to the client-side container 315-2. The client-side container 315-1 is also designed to look for this additional information in the SOAP header, and if it is found, the client-side container 315-1 authenticates the additional information locally. At the end of this exchange, both client-side container 315-1 and server-side container 315-2 know whether or not they are compatible.

If they are compatible, the client-side container 315-1 sends a final acknowledgment (not shown) to the server-side container 315-2 indicating compatibility. Once the server-side container 315-2 receives this final acknowledgment (not shown), it sends a special SOAP message, whose payload contains executable statements instead of data. For instance, turning to FIG. 7, an exemplary SOAP message 700 is shown having a SOAP envelope 705. SOAP envelope 705 comprises a SOAP header 710 and a SOAP body 720. SOAP body 720 comprises executable statements 730, which are not defined by the SOAP.

Returning to FIG. 6, this executable statements 730 are then extracted by the client-side container 315-2 to form extracted programs. The client-side container 315-2 then executes the extracted programs locally. As FIG. 6 indicates in reference 690, the extracted programs could be the server-side SOAP proxy 630 and the data checking and conversion module 625. By pushing this logic out to the client-side container 315-2, a number of benefits can be achieved, among which are the following: (1) the scalability of the server 310-2 is improved, since some of the Web Service logic is offloaded to the client 310-1; and (2) simple errors in parameters passed to a Web Service call will not require round-trips to the server 310-2, since the error checking is done on the client-side container 315-2 itself. These benefits translate into performance advantages for the client 310-2, and scalability advantages for the server 310-1.

After the data checking and conversion module 625 and SOAP server proxy 630 have been pushed to the client-side container 315-2, a native protocol 670 is used for messages over network 640. It should be noted that the native protocol 670 may also be in addition to other protocols, such as TCP-Internet Protocol (TCP-IP).

The exemplary mechanism for transparent coupling shown in FIG. 6 is compatible with existing open standards for Web Services interaction, because if one container 315 received a SOAP message from an incompatible container, the container 315 would simply process the SOAP payload as it would normally. In other words, the payload in a SOAP message would be processed as XML payload data, not executable statements 730.

Security concerns can also be addressed by allowing the client-side container 315-2 (e.g., at install or configuration time) to constrain the set of operations that will be allowed on code pushed down by the server-side container 315-1.

Figure 7:
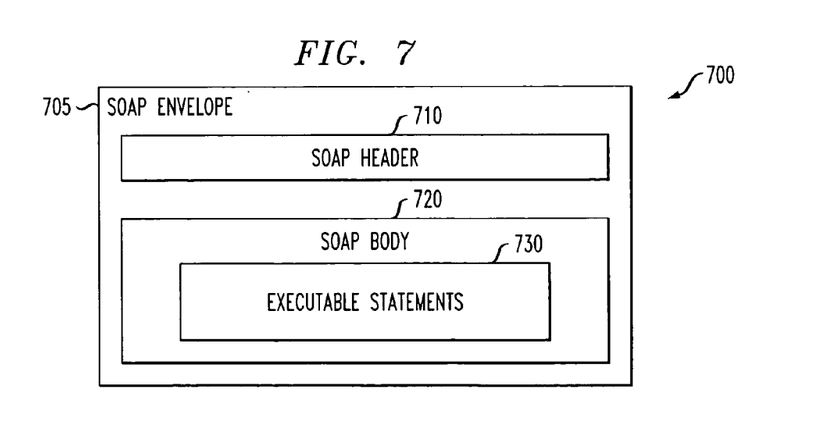
FIG. 7 is another example of a message having a portion not defined by the SOAP and having a portion defined by the SOAP, where the message of FIG. 7 is used in the examples of FIG. 6.

As another example, the client-side container 315-2 could request information from database 610. For instance, the requested information could concern a table having multiple entries in the database 610. Instead of having the client-side container 315-2 perform several requests for several of the multiple entries in the database 610, the server-side container 315-1 can send, with encryption or other security measures if desired, the table to the client-side container 315-1 by using SOAP messages 700 having a payload 730 containing portions of the table. The client-side container 315-1 can then perform accesses directly to the table.

It is to be understood that the embodiments and variations shown and described herein are merely illustrative of the principles of this invention and that various modifications may be implemented by those skilled in the art without departing from the scope and spirit of the invention.

What is claimed is:

1. A method for transparent coupling between compatible containers communicating over networks, the method performed by a first container and comprising the steps of:
   determining, by using one or more messages defined by the open-standard protocol and communicated over one or more networks coupled to a second container, whether the second container can communicate using messages having a portion not defined by an open-standard protocol and having a portion defined by the open-standard protocol; and
   communicating, with the second container, at least one additional message having the portion not defined by the open-standard protocol and having the portion defined by the open-standard protocol, wherein the portion not defined by the open-standard protocol occupies a predetermined part of the at least one additional message that would be defined by the open-standard protocol if the open-standard protocol were used for the predetermined part.

2. The method of claim 1, wherein the step of determining further comprises the step of including identification information in at least one of the one or more messages defined by the open-standard protocol, the step of including performed in accordance with the open-standard protocol.

3. The method of claim 2, wherein the identification information identifies the first container.

4. The method of claim 3, wherein the identification information identifies the first container by including a container name and a version.

5. The method of claim 2, wherein the step of determining further comprises the steps of:
   receiving at least one of the one or more messages defined by the open-standard protocol;
   searching for return identification information in the received at least one message; and
   authenticating any return identification information.

6. The method of claim 5, wherein the step of determining further comprises the step of sending, if the return identification information is authenticated, a given one of the one or more messages defined by the open-standard protocol to the second container, the given message including a final acknowledgment added to the given message in accordance with the open-standard protocol.

7. The method of claim 1, wherein the step of communicating further comprises the steps of:
   creating a given one of the at least one additional messages;
   placing information not defined by the open-standard protocol in the predetermined part of the given additional message.

8. The method of claim 7, wherein the information comprises one or more of the following: executable statements, binary data, records, and database tables.

9. The method of claim 1, wherein the open-standard protocol is a version of simple object access protocol (SOAP), and wherein the portion of the at least one additional message not defined by the open-standard protocol occupies a payload of a SOAP envelope.

10. The method of claim 1, wherein the portion not defined by the open-standard protocol comprises information including one or more of the following: executable statements, binary information, proprietary information, and database elements.

11. The method of claim 10, wherein the method further comprises the step of compressing the information, the step of compressing performed prior to the step of communicating.

12. The method of claim 1, wherein the step of communicating further comprises the step of transmitting, to the second container, at least one additional message having the portion not defined by the open-standard protocol and having the portion defined by the open-standard protocol.

13. The method of claim 1, wherein the step of communicating further comprises the step of receiving, from the second container, at least one additional message having the portion not defined by the open-standard protocol and having the portion defined by the open-standard protocol.

14. The method of claim 1, wherein:
   the step of communicating at least one additional message further comprises the step of receiving at least one additional message having the portion not defined by the open-standard protocol and having the portion defined by the open-standard protocol;
   the portion not defined by the open-standard protocol comprises executable statements; and
   the method further comprises the step of executing the executable statements.

15. The method of claim 14, wherein the method further comprises the step of decompressing the executable statements, the step of decompressing performed prior to the step of executing.

16. The method of claim 1, wherein the first container is executed by a first computer and wherein the second container is executed by a second computer.

17. The method of claim 1, wherein the steps of determining and communicating are performed by a proxy that is integral with first container.

18. An apparatus for transparent coupling between compatible containers communicating over networks, the apparatus comprising:
   one or more memories comprising a first container; and
   one or more processors coupled to the one or more memories, the one or more processors configured, when executing at least a portion of the first container:
   to determine, by using one or more messages defined by an open-standard protocol and communicated over one or more networks coupled to a second container, whether the second container can communicate using messages having a portion not defined by an open-standard protocol and having a portion defined by the open-standard protocol; and
   to communicate, with the second container, at least one additional message having the portion not defined by the open-standard protocol and having the portion defined by the open-standard protocol, wherein the portion not defined by the open-standard protocol occupies a predetermined part of the at least one additional message that would be defined by the open-standard protocol if the open-standard protocol were used for the predetermined part.

19. The apparatus of claim 18, wherein the one or more processors are further configured, when determining whether the second container can communicate to include identification information in at least one of the one or more messages defined by the open-standard protocol, the including performed in accordance with the open-standard protocol.

20. The apparatus of claim 18, wherein the one or more processors are further configured, when communicating at least one additional message:
- to create a given one of the at least one additional messages;
- to place information not defined by the open-standard protocol in the predetermined part of the given additional message.

21. The apparatus of claim 20, wherein the information comprises one or more of the following: executable statements, binary data, records, and database tables.

22. The apparatus of claim 18, wherein the open-standard protocol is a version of simple object access protocol (SOAP), and wherein the portion of the at least one additional message not defined by the open-standard protocol occupies a payload of a SOAP envelope.

23. The apparatus of claim 18, wherein the portion not defined by the open-standard protocol comprises information including one or more of the following: executable statements, binary information, proprietary information, and database elements.

24. The apparatus of claim 23, wherein the one or more processors are further configured to compress the information, the compression performed prior to the communicating of the at least one additional message.

25. An article of manufacture for transparent coupling between compatible containers communicating over networks, the article of manufacture comprising:
- a computer readable medium containing one or more programs which when executed on a first container implement the steps of:
- determining, by using one or more messages defined by an open-standard protocol and communicated over one or more networks coupled to a second container, whether the second container can communicate using messages having a portion not defined by an open-standard protocol and having a portion defined by the open-standard protocol; and
- communicating, with the second container, at least one additional message having the portion not defined by the open-standard protocol and having the portion defined by the open-standard protocol, wherein the portion not defined by the open-standard protocol occupies a predetermined part of the at least one additional message that would be defined by the open-standard protocol if the open-standard protocol were used for the predetermined part.

* * * * *